United States Patent
Siev et al.

(10) Patent No.: US 7,739,384 B2
(45) Date of Patent: Jun. 15, 2010

(54) SYSTEM AND METHOD FOR LOAD BALANCING

(75) Inventors: Amnon Siev, Herzlya (IL); Chava Laviatan, Ra'anana (IL)

(73) Assignee: Flash Networks Ltd. (IL)

( * ) Notice: Subject to any disclaimer, the term of this patent is extended or adjusted under 35 U.S.C. 154(b) by 1209 days.

(21) Appl. No.: 10/450,239

(22) PCT Filed: Dec. 13, 2001

(86) PCT No.: PCT/IL01/01162

§ 371 (c)(1),
(2), (4) Date: Nov. 12, 2003

(87) PCT Pub. No.: WO02/48823

PCT Pub. Date: Jun. 20, 2002

(65) Prior Publication Data

US 2004/0071087 A1    Apr. 15, 2004

Related U.S. Application Data

(60) Provisional application No. 60/255,075, filed on Dec. 14, 2000.

(51) Int. Cl.
*G06F 15/173* (2006.01)
*G06F 15/16* (2006.01)
*G06F 9/46* (2006.01)

(52) U.S. Cl. .............. 709/226; 709/225; 709/227; 709/228; 709/229; 709/238; 709/239; 709/240; 709/241; 709/242; 718/105

(58) Field of Classification Search ............... 709/226, 709/225
See application file for complete search history.

(56) References Cited

U.S. PATENT DOCUMENTS

| 5,774,660 | A  | * | 6/1998  | Brendel et al. | ............. 709/201 |
| 6,691,165 | B1 | * | 2/2004  | Bruck et al.   | ............. 709/227 |
| 6,981,056 | B1 | * | 12/2005 | Aviani et al.  | ............. 709/239 |
| 7,003,574 | B1 | * | 2/2006  | Bahl           | ............. 709/228 |
| 7,185,113 | B1 | * | 2/2007  | Haberman et al.| ............. 709/250 |
| 2002/0062377 | A1 | * | 5/2002 | Hillman et al. | ............. 709/227 |
| 2005/0256958 | A1 | * | 11/2005 | Wilson        | ............. 709/227 |
| 2005/0262173 | A1 | * | 11/2005 | Choquier et al.| ............. 707/204 |

OTHER PUBLICATIONS

Dias et al. "A scalable and highly available web server"; Compcon '96. 'Technologies for the Information Superhighway' Digest of Papers; Publication Date: Feb. 25-28, 1996; On pp. 85-92.*
Zaki et al. "Customized dynamic load balancing for a network of workstations"; Proceedings of the High Performance Distributed Computing (HPDC '96); Year of Publication: 1996.*

* cited by examiner

*Primary Examiner*—Vivek Srivastava
*Assistant Examiner*—Lin Liu
(74) *Attorney, Agent, or Firm*—Smith Frohwein Tempel Greenlee Blaha, LLC; Gregory Scott Smith (57) ABSTRACT

The present invention is a method and system of load balancing in a group of one or more servers connected to one or more subnetworks. Two or more independent servers are bound into a group, with one of the servers elected to serve as a leader. The leader acts as a load balancer for the group while the remaining servers act as slaves. This functionality eliminates the need for one or more dedicated load balancing devices and lowers the hardware requirements necessary for performing such load balancing.

24 Claims, 5 Drawing Sheets

SYSTEM AND METHOD FOR LOAD BALANCING

CROSS REFERENCE TO RELATED APPLICATIONS

This application claims priority to U.S. Application No. 60/255,075 filed on Dec. 14, 2000.

FIELD OF THE INVENTION

The present invention relates to packet based data communication networks utilizing standards such as TCP/IP, UDP/IP etc.

BACKGROUND OF THE INVENTION

An "Intranet" is a private network that uses protocols and standards similar t o the public Internet, but instead is used only by authorized users. These Intranet networks utilize protocols such as the Transmission Control Protocol/Internet Protocol TCP/IP, the User Datagram Protocol/Internet Protocol UDP/IP, Real-time Transfer Protocol RTP, or multicasting to establish the communication between computers. This communication link may be established by means such as an Internet browser, an HTTP server, an FTP server or the like.

With the popularity of Intranet networks increasing, service providers such as cellular operators, satellite communication operators, Internet Service Provider (ISP) and application service providers are using more than one server in a "server farm site" to accommodate the heavy load of users, and thus, improve reliability in the network. Such a configuration, however, requires a load balancing mechanism to divide the aggregate bandwidth and load among the servers in the site. Additional load balancing units are then used to add redundancy and to improve reliability of a site.

While load balancing mechanisms are heavily utilized to accommodate the explosive growth of network usage, the prior art load balancing technology has several limitations. One such limitation is the requirement of additional hardware. Load balancing techniques, as they exist in the prior art typically cannot operate without adding additional hardware components to the network, which makes such procedures a costly endeavor. Additionally, the existing equipment used for load balancing cannot be used in sites operating tunneling communication, which enables one network to send its data via connections on another network. One tunnel may carry many TCP sessions, which may originate from different sources to several destinations. Current load balancing equipment replaces the source IP address or the destination IP address with the IP address of the load balancing equipment. This creates a problem in sites operating tunneling communication because several clients with different IP addresses are using the same tunnel. Thus, a packet in the tunnel segment may have the destination address of the slave and not the final destination address. Therefore the receiver of the message, in the internet side, misses the original identity of the client and it can not give customize services, additionally in some cases the source IP is used for security mechanism so its important to keep the original source IP.

Moreover common load balancing mechanisms cannot be used with a connection that has been initiate from the Internet side via the "server farm site" to a client.

Therefore, there is a need in the art for a system and a method for a server that will be able to perform load balancing processes that can accommodate sites operating tunnel communication by maintaining the same packet address on the client side and on the network side (transparent operation) and perform load balancing in both directions.

SUMMARY OF THE INVENTION

The present invention overcomes the above-described drawbacks in the prior art by providing a system and a method for load balancing that binds two or more independent servers to one group. One of the servers is elected as a leader (the Master), which acts as a load balancer for the group, while the remaining servers act as slaves. The selected server, the Master, may perform as a common server in addition to its load balancing activity. In case of having only one working server in a site, this server acts as the load balancer (the leader) and as a slave. Once elected, the leader is transparent to the network as well as the client To improve reliability in the network, the present invention gives each one of the servers in the group the capabilities to be a leader. This functionality eliminates the need for one or more special load balancing devices in the event the leader fails. Furthermore, this aspect of the present invention operates to increase the reliability of the network as hardware requirement on each site decreases.

An exemplary embodiment of present invention comprises of a Router between the group of the servers and the Network. The Router has been configured, by the system administrator, that the remote clients, from the other side of the group of servers, are connected directly to an interface (port) of the Router, spoofing the router that they are local clients. Therefore the Router upon getting a packet from the network with an IP destination address of one of the remote clients, the router broadcasts an ARP request to the sub networks on the other side, which includes the group of the servers "the Servers Farm".

ARP is "Address Resolution Protocol," an IP protocol used to obtain the physical address of a node. A source station broadcasts an ARP request onto the network with the IP address of a target node, and the target node responds by sending back its physical address to enable the transmission of packets. ARP returns the layer 2 address for a layer 3 address. The appropriate server from the group answers the ARP request. The utilization of the proxy ARP makes the server farm transparent to the network.

Other objects, features, and advantages of the present invention will become apparent upon reading the following detailed description of the embodiments with the accompanying drawings and appended claims.

DETAILED DESCRIPTION

Figure 1:
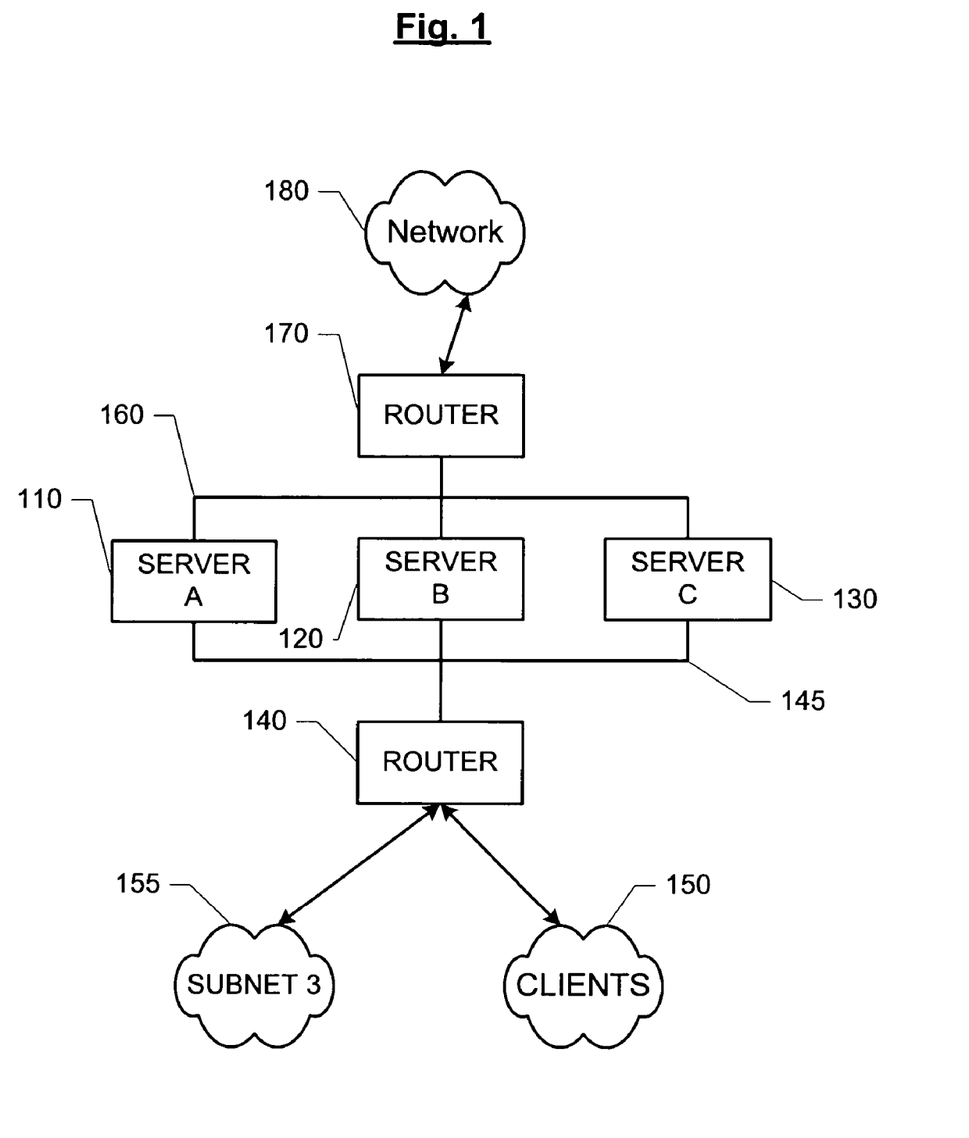
FIG. 1 is a system diagram that illustrates an exemplary environment suitable for implementing various embodiments of the present invention.

Referring now to the drawings, in which like numerals refer to like parts throughout the several views, exemplary embodiments of the present invention are described. FIG. 1 is a system diagram that illustrates an exemplary environment suitable for implementing various embodiments of the present invention. A preferred environment suitable for implementing the present invention may be a satellite station site. Servers A, B, and C 110, 120 and 130 are three servers that perform the same functionality and share the communication traffic between subnet 160 and subnet 145.

Three servers, 110 to 130, are shown in FIG. 1 by way of example, and a number of servers other than three can be in a server farm, which is using methods in accordance with embodiments of the present invention.

Subnet 160 is connected via router 170 to network 180. Network 180 may be the Internet or an Intranet. On the other side, the three servers are connected via subnet 145 and router 140 via the transmitter and satellite relays to remote clients 150. Tunneling protocol may be used in one or more segment from said servers to one or more clients 150. In other exemplary embodiments Router 140 does not exist and clients 150 are connected directly to subnet 145. Subnets 160 and 145 may be on the same Local Area Network (LAN).

Each server 110, 120, 130 may have a separate port per each subnet. Each server has a private IP address and the site, the group as an entity, has one or more joint virtual IP addresses representing all servers in the site. For example; joint IP 1 address, may be used by the clients 150 when they request to establish tunneling connection with the server farm (for using the functionality of the farm). Joint IP 2 address, may be used by router 140 for traffic to destination behind router 170 without using the functionality of the group of servers. For example traffic from subnet 155. Joint IP 3 may be used by router 170 to transfer packets to a destination behind router 140 but said destination is not one of the clients 150 of the server farm, such as a destination that belongs to subnet 155.

Figure 2:
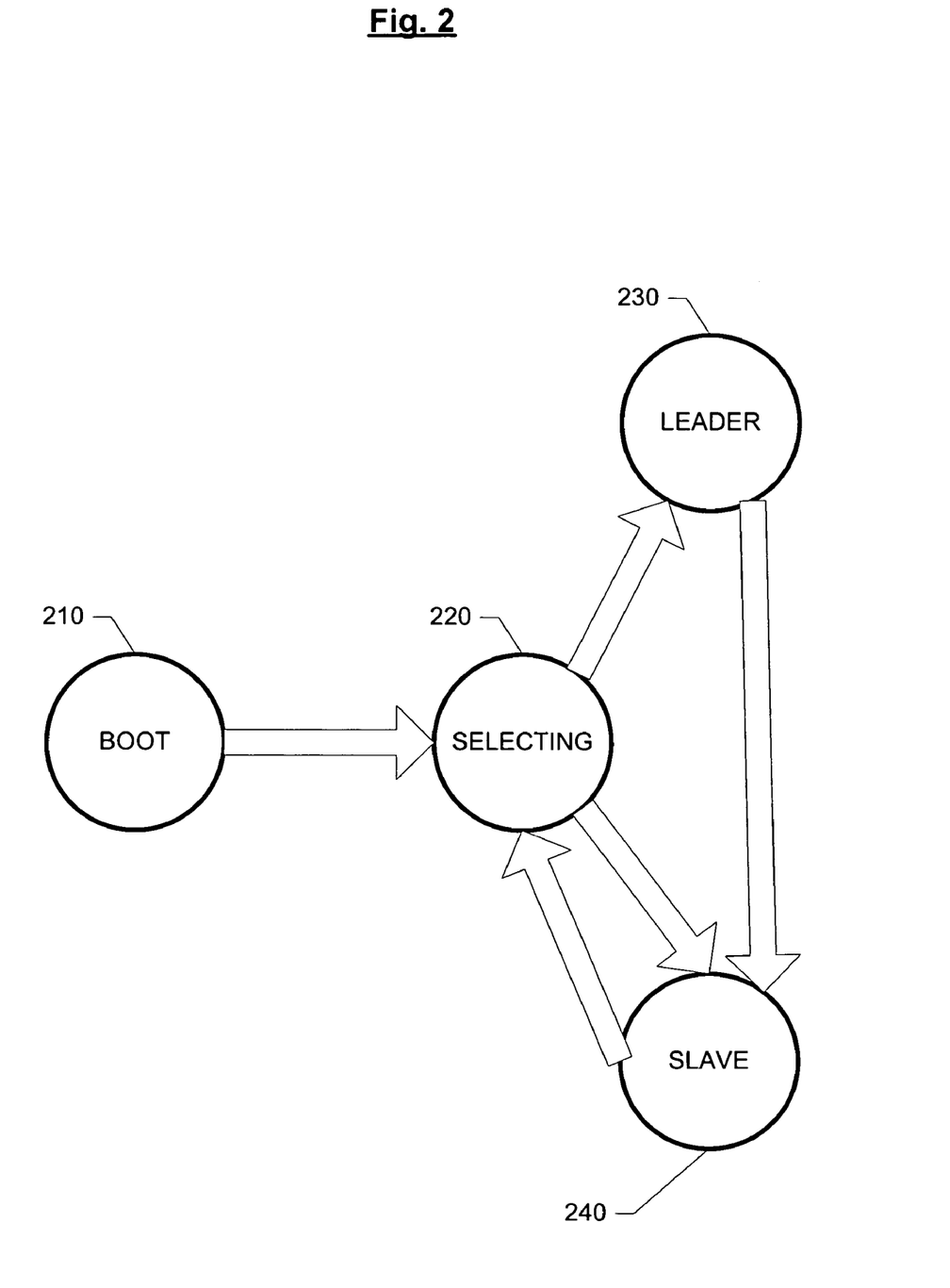
FIG. 2 is a state diagram illustrating four modes of operation of an exemplary embodiment of the present invention.

FIG. 2 is a state diagram illustrating the modes of operation of an exemplary embodiment of the present invention. Initially, the system is powered up or reset into a Boot Mode 210. While in Boot Mode 210, the system then enters into a Selecting Algorithm Mode 220. In Selection Algorithm Mode, 220, each server verifies whether it can be the leader. If yes, the server may enter Leader Mode 230. If not, the server can only enter the Slave Mode 240. For time to time, if a server operating in the Slave Mode 240, it returns to the Selecting Algorithm Mode 220 to verify that the leader is still operating, if yes, the status of that server must return to slave mode 240. Otherwise, a new election cycle will start in which the lead server will be selected. In case that a new leader is selected the previous one moves to slave mode 240.

Figure 3:
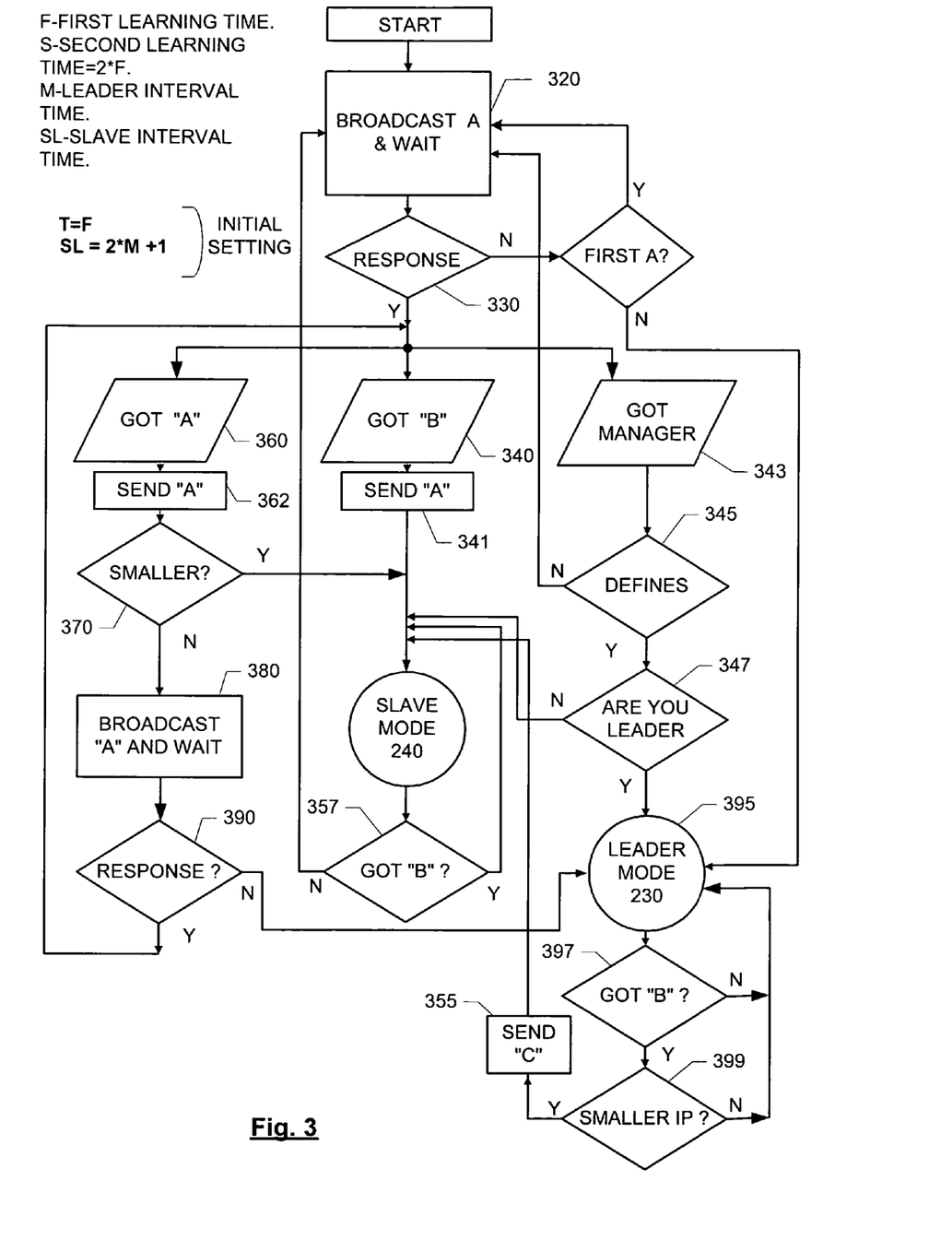
FIG. 3 is a flow diagram illustrating the steps of a preferred example of the leader's Selecting Algorithm.

FIG. 3 is a flow diagram illustrating the steps of an example algorithm that operates the Selecting Algorithm mode 220. The Selecting Algorithm 300 handles four cases:

Case 1: "Power On" state of the site. Every server is looking for its appointment as the leader or a slave.

Case 2: A steady state case. The leader is either server 110,120 or 130,and the remaining servers act as slaves.

Case 3: A "Power On" state of a single server. A single server is turned on, while the other servers are working with a selected leader. For example, servers 110 and 130 are working with server 130 as the leader while server 120 is turned on.

Case 4: The system is unclear about the status of the leader is not inactive and a replacement leader is required.

When a server enters into the Selecting Algorithm Mode 220 and starts the Selecting Algorithm 300, a message type "A" 320, requesting to be a leader, is broadcast on LAN 145. The A type message may include the server IP address and the letter A. The server then waits a predetermined amount of seconds, "F" seconds, for a "B" type message response. At step 330, the delay has completed and the server checks for the reception and the response. If a response was received, processing continues at step 340, otherwise processing continues at step 335. At step 340, a response (message type B) has been received. Message B is a message that an existing leader sends every M seconds, with "M" being a predetermined amount of seconds. Upon receipt 340 of a message type B response message, the server resends 341 a message type A then continues at step 350 to move into Slave Mode 240. Thus, the algorithm operates to maintain the same leader if the group already has a leader.

If the response in step 330 is an A type message from another server (step 360), another server is attempting to be a leader. The server resends 362 a message type A and then, at step 370, the server compares its private IP address with the IP address of the server sending the A type message. The server with the smaller IP address serves as the slave 350. If the server private IP is greater than the response IP address, then the server broadcasts 380 a new "A" message over the LAN 145 and waits for time "T". In one embodiment, time T is shorter than time F, such as 85% of "T". Those skilled in the art will appreciate that other decision criteria may be used besides comparing IP addresses, such as a MAC address or CPU Serial Number and the provided example is just one means to arbitrate the decision.

If there is not a response at step 390, the server has the largest private IP address and the server moves to leader mode 230. Otherwise, if the server receives a response in step 390, the server moves to the appropriate step out the three possible steps based on the response: 360, 340 or 343.

If the operator wants to select a particular server as the leader, the manager 343 sends the response message to indicate such selection. In step 345, the server checks if the message defines the leader. If not, the server returns to step 320. If the message does define the leader, the server determines in step 347 if it is the leader. If so, the server moves 395 into Leader Mode 230. Otherwise, the server moves 350 to Slave Mode 240.

If there is not a response at step 330, the server continues at step 335 and checks if the message was the first "A" type message. If the message was the first "A" type message, the server completes boot mode 210 and resends 320 a second "A" type message. Otherwise, the server becomes the leader at step 395.

The learning algorithm may comprise a section that prevents election of more than one leader. This would involve that the leader listen 397 over LAN 145 for a B type message that indicates the presence of an active leader server. This B type message may comprise the sender IP address and the letter B, but the message may include any other indication of an active leader. If there is not another B type message, the server resends B type message and returns to step 395 and remains the Leader. If there is another B type message, the server compares its private IP address with the private IP address of the sender of the response B type message at step 399. If the IP address is greater, it remains the Leader resends B type message and returns to step 395. If its IP address is smaller than the IP address of the sender of the response B type message, it reverts to slave mode. In this case at step 355, the server sends a C type message to the source of the response B type message. The C type message indicates that the server gives up the leadership and that the sender of the response B type message has to take command. Then the server moves to step 350 and reverts to slave mode 240.

The learning algorithm may periodically verify that the leader is still active. In step 395, the leader sends the message 'B' every 'M' seconds to indicate it is an active leader. Every 'SL' seconds, each slave checks in step 357 that a B type message has been received during the time period in-between the previous 'SL' interrupt to the current one. In one embodiment, the 'SL' period is determined by 'SL'=2 * 'M'+1. If it receives a B type message, the server returns to step 350. Otherwise, it returns to step 320 and sends a request to be a leader.

At the conclusion of the Selecting Algorithm, the system is stable with all of the slaves aware of the leader private IP address, all of the servers aware of the joint IP addresses, and each slave aware of the total bandwidth and the default router 170 to the Internet and router 140 to the clients. Each slave must have a TCP connection via subnet 145 with the leader otherwise it will continue trying to open a TCP connection till it succeeds.

Figure 4:
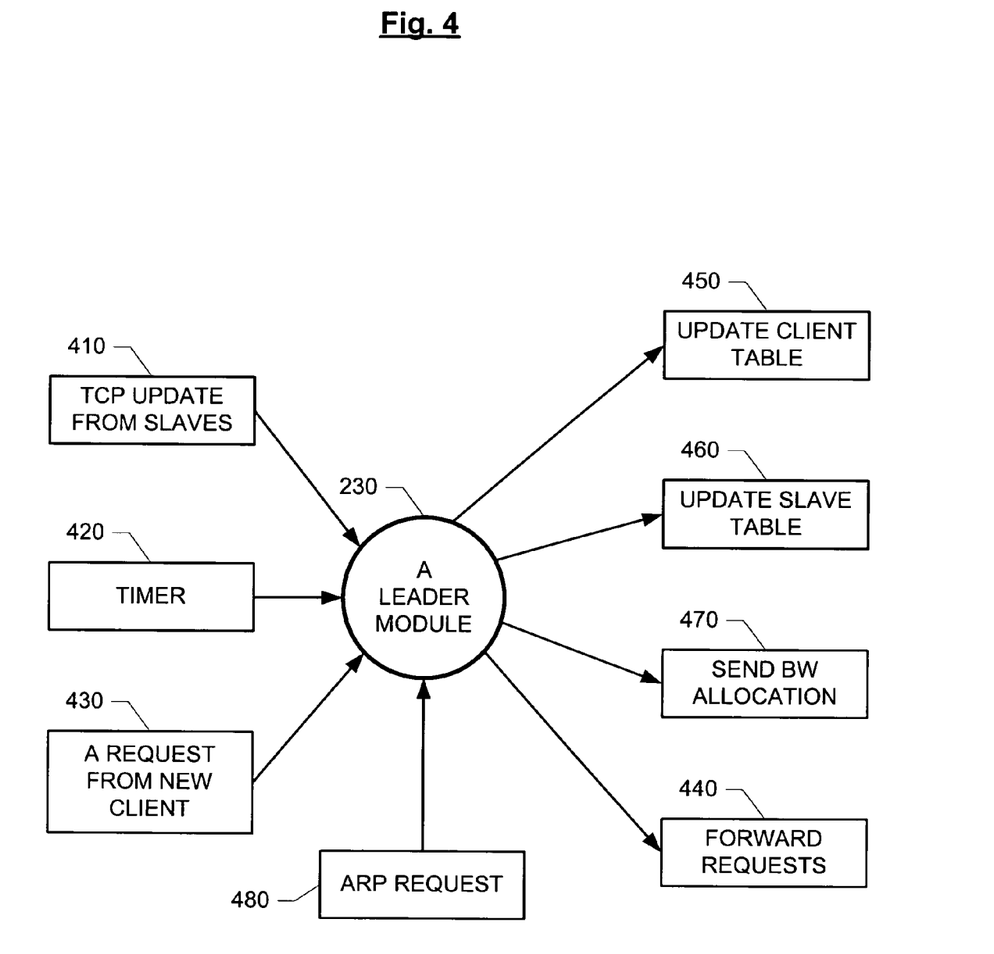
FIG. 4 is a functional block diagram illustrating the leader's mode of operation as the Load Balancer.

FIG. 4 is a functional block diagram illustrating the leader's mode of operation 230 as the Load Balancer. When a server becomes a leader, it sends a "Gratuitous ARP" on each one of the joint IP addresses. The appropriate routers respond by updating their IP address mapping.

Occasionally, the leader receives update information from a slave 410 via the control TCP connection on LAN 145 or LAN 160. This update includes various information for load calculation including, but not limited, to private IP address, IP addresses of the remote clients that are assigned to it, the number of active tunneling connections, number of open tunneling connections currently without traffic, the number of non-tunneling connections, buffer load, CPU load, TCP connections, and BW allocation. Upon receipt of the update information, the leader updates 460 the slave database, which is referenced when computing load balancing calculations.

When a new request from a client arrives 430, the request can be for a tunneling connection or a common TCP connection. The leader performs load balancing calculations based on parameters including, but not limited to, the number of open tunneling connections, the number of non-tunneling connections, buffer load, CPU load, TCP connections, and BW allocation for each server, including the leader. After computing the load balancing calculations, the request is forwarded 440 to the appropriate slave or the leader may handle the request itself. Then, the leader updates its client table 450 and the slave database 460 with the new connection. Occasionally, the leader receives an interrupt from timer 420, and the leader sends the new BW allocation to each slave via subnet 145.

To allocate system resources among the slaves, the leader may divide the bandwidth equally among the slaves. The leader may also dynamically divide the bandwidth based on the load of each slave. Any method of allocating system resources may be utilized which allows the system to perform the load balancing of the present invention.

Timer 420 sends the time intervals to the leader. Every 'M' seconds the leader broadcasts the B type message, and every update interval the leader sends via the TCP connection on subnet 145, the BW allocation to each slave and waits few seconds to get an update from each slave. If the slave does not respond within the appropriate time, the leader assumes that the server is disconnected from the system, and therefore, removes the clients which were served by said slave from the database maintained by the leader. When a client that has been removed requests to renew the connection, the leader will refer to it as a new client and will transfer it to another slave.

Upon receiving an ARP request 480 from router 170 the leader determines whether the requested IP address belongs to a remote client 150 of the server farm or it is one of the joint IP addresses. If not, the leader ignores the request. If yes, the leader checks whether this IP address has been already assigned to one of the servers. If yes, the leaders ignores the request else the leaders determines according to the current load of each of the servers, which one will be assigned to said IP address and forward the request to the selected server.

Figure 5:
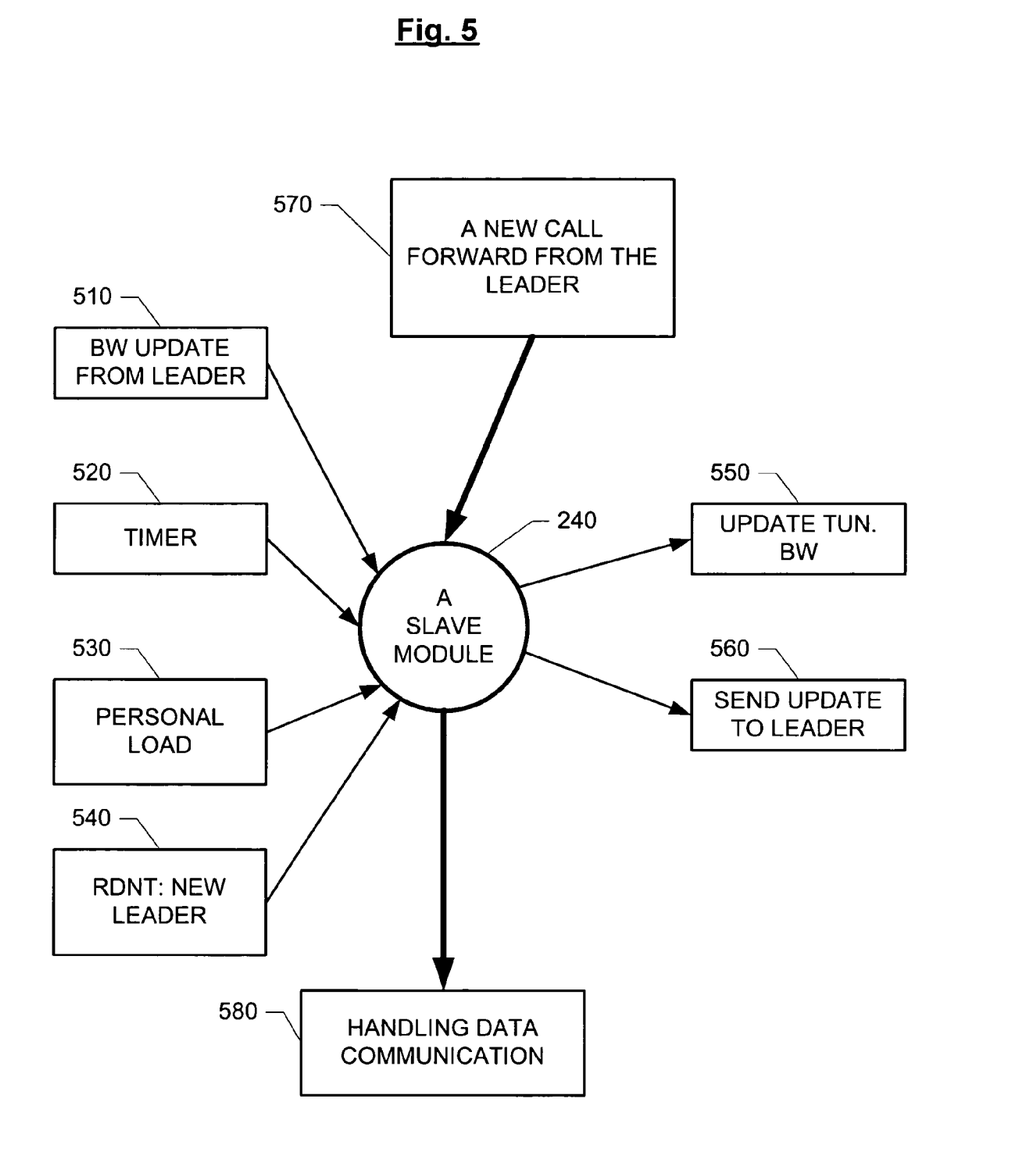
FIG. 5 is a functional block diagram illustrating the slave's mode of operation.

FIG. 5 is a functional block diagram illustrating the slave's mode of operation 240. When a slave is aware that a new leader 540 is in charge, it sends its current status to the new leader via subnet 145. This message includes parameters like but not limited to: the private IP address, the number of active tunneling connections, the number of open tunneling connections, the list of clients, the number of non-tunneling connections, buffer load, CPU load, TCP connections, and bandwidth allocation etc.

The leader periodically sends 510 an update of the bandwidth allocation to each server. Each slave calculates the transfer rate of each connection using this update information and updates the tunneling clients and the TX side with the new bandwidth 550 of the relevant connection.

Each slave receives timing signals such as "SL", "F", and "S" from timer 520. The slaves use those signals according to the step in which the slave is currently operating. For example, at every "SL" interrupt from the timer 520, the slaves determine whether a B type message has been received in between the current "SL" interrupt and the previous "SL" interrupt. Each slave uses the "F", "S" and the "T" in several steps of the selecting algorithm as described in conjunction with FIG. 3.

Those skilled in the art will appreciate that different time values may be used, including but not limited to F=9 seconds, S=18 seconds, M=3 seconds, and SL=7 seconds.

Periodically, a slave sends 560 an update via the TCP connection to the Leader. The leader forwards the new calls to a slave 570, which handles the calls independently 580. The server may response to an ARP request or opening a tunnel to a remote client.

The server acting as a Leader may reserve the required resources, which are needed for acting as a leader, and may use the rest of the resources as a slave, while sharing the communication load with the other slaves.

The following section with FIG. 1 describes the method, which is used for achieving the transparent and symmetrical load balancing process of servers 110, 120 and 130 as one group, which is located in a node between a client and the network with one server, such as server B 120, as the leader. Transparent and symmetrical means that the network side of the connection line is not aware of the group of the servers when the connection is initiated by a remote client or when the connection is initiated from the network side to a remote client. In both cases the network side of the connection line is referring only to the IP address of the remote client without knowing of the existing of the group of servers. The system administrator configures the remote client 150 subnets in the subnets list of the router 170. This router is the only path to the client subnet. Spoofing the router 170 that the remote clients 150 are connect directly to the same interfaces of the router 170 that the group of the servers is connected to. Pretending that the response is from the remote client and not from one of the servers. The configuration is such that it appears to router 170 that the clients 150 are connected directly to its ports (interfaces) via subnet 160 and not on the other side of subnet 145. Therefore, when a packet, from network 180, with a destination IP address of one of those clients 150 reaches the router 170, the router broadcasts an ARP request over subnet 160 with the IP address of the client. The leader, in case of a new call or one of the slaves that has an open connection with the relevant client, responds to the ARP request. The server then provides the router with its physical address and not the client physical address. The router responds by transmitting the packet to the relevant server, whether the server is a leader or a slave, and not to the client although the server IP address is not the packet destination IP address. By this method, the present invention is transparent to the network 180. Thus, spoofing the router comprises configuring its subnets list with the remote client subnet and pretending that the remote clients are connecting to an interface of said router.

Additionally, the system administrator adds to the IP mapping of router 170 the joint IP 3 address as the next HOP for the subnetwork 3 155 that is connected behind Router 140 but does not belong to any one of the clients 150. The system administrator also adds to the routing table (IP mapping) of router 140 the joint IP 2 address as the next HOP of IP traffic to the Internet for clients that are on subnet 155. Thus, spoofing may also include configuring the IP mapping of a router with one of the joint IP address as the next HOP to the subnetwork, which does not comprise remote clients of said group of one or more servers.

When a tunneling client 150 sets up a new tunneling connection, the client sends a request with the joint IP 1 address. Only the leader responds to the joint IP 1 address and, based on load balancing calculations, the leader transfers the call to a selected slave that will reply to the request with its private IP address. The tunnel is set between the client and the selected slave, with the next tunneling packets carrying the selected slave private IP address.

If a client 155 is not a tunneling client, the packet sent contains the destination IP address via router 140. The router 140 on subnet 145 sends the packet to the joint IP 2, with the leader choosing one of the slaves to be active on the joint IP 2 and to respond to packets with joint IP 2. This slave will act as a relay by transferring the packet to router 170. The selected relay can be changed dynamically by the leader according to the load calculations. For the load balancing decisions, the leader uses the information from its client and slave database, which includes all the open connections.

When router 170 receives a packet with a destination IP address in subnetwork 3 155, the router sends the packet to the joint IP 3 while the leader chooses one of the slaves to be active on the joint IP 3 and to respond to packets with joint IP 3. This slave will act as a relay and transfer the packet to Router 140, which is then transferred to the appropriate destination in subnet 3 155. The leader, according to the load calculations, can dynamically replace the selected relay. For the load balancing decisions, the leader is using the information from its client and slave database, which includes all the open connections.

The system administrator configures the servers with the "ARP Aging Time" of Router 170. Based on this value, the present invention calculates a parameter "ARP_TIME_OUT," which is longer than the "Aging Time", those parameters are described in details below in conjunction of Scenario 3.

Following are several examples of process that the present invention utilizes for several types of scenarios:

Scenario 1:

A new tunneling request arrives form a client 150, with a joint IP 1 address. Any new request for tunneling uses the Joint IP 1 address of the group. The preferred example of the present invention performs the following process:
1. Only the leader responds to packets with the joint IP. The leader updates the client database.
1.1 The leader performs load balancing calculation and selects a slave.
1.2 The leader updates the slave database.
2. The leader forwards the request to the selected server.
3. The selected server replies to the client 150 with the server's private IP address and both sides establish a tunneling connection according to the tunneling protocol.
4. Traffic is directed to the Internet 180 via the selected server & the router 170.
5. Packets that arrive from the Internet 180 with the destination IP address of said client reaches the router 170, which assumes that the client is connected to its port. The router grabs the packet.
6. Router 170 broadcasts an ARP request over subnet 160.
6.1 The leader is aware that the selected server has an open tunneling with the client, and therefore the leader ignores the ARP request.
7. The selected slave, which has an open tunneling connection, sends a reply.
8. Traffic goes though the selected server via the open tunneling to the client.

Scenario 2:

Traffic arrives from Internet 180 to a client 150 that does not have an open tunneling connection with any of the servers 110, 120 or 130. The preferred example of the present invention will perform the following process:
1. Packet that arrives from the Internet 180 with the destination IP address of a client 150 reaches router 170, which assumes that the relevant client is connected to its port and stores the packet.
2. Router 170 broadcasts an ARP request over subnet 160.
2.1 The leader, aware of all the current connections, is aware that the client doesn't have an open tunneling with any server, and therefore, the leader responds to the ARP request.
2.2 The leader receives the request and determines which slave is the most suitable to handle the client.
2.3 The leader forwards the ARP request to the selected slave.
3. The selected slave replies to the ARP request.
4. The selected slave tries to establish a tunneling connection with the destination client.
5. Traffic is directed through the selected server via the open tunneling connection to the client or the server receives the tunneling traffic.

Scenario 3:

The connection is a closed normal connection, i.e., both sides are aware of the connection.

To avoid a situation that packets from the Internet that reach the router 170 immediately after the connection closes will not be served, the preferred example of the present invention keeps the selected slave active for a period longer then the aging time of the router 170 and then it stops serving the relevant client. The present example performs the following process:
1. The selected slave decides to close the connection, for a reason such as a timeout.
2. The client receives a connection close signal from the slave.
2.1 The slave closes the tunnel but remains responsible for the client.
2.2 If the client tries to reconnect using the joint IP 1 address, the leader will direct his request to the same slave.
3. Any traffic arrives from the Internet 180 to said client goes though the same slave until the next "ARP_TIME_OUT" interrupt.
3.1 If before the time out occurs, the router will send an ARP request and the selected server will answer. The server will reset it ARP_TIME_OUT timer.

3.2 If necessary, the selected server opens a new tunneling connection with the client.
4. If the tunnel is closed and there is no traffic during ARP-TIME_OUT, the selected server will report to the leader that the connection is closed.
5. New traffic to the same client 150 will be handled by the leader, who may select another server to handle the new connection.

Scenario 4:
If there is an abnormal connection close, for example, the client fails; the present invention will perform the following process:
1. The selected slave will keep the connection open for a time-out period.
2. The client may boot again and will attempt connection with the leader by using the joint IP 1 address.
3. The leader is not aware of any change because the selected slave keeps the connection open. Therefore, the leader redirects the connection request to the same slave.
4. The same slave will reply to the client and the connection will work normally.

Scenario 5:
If there is an abnormal connection close because of a server failure, the present invention will perform the following process:
1. Until the leader becomes aware of the problem, traffic from the Internet 180 to the clients 150 of the server is lost.
2. The leader does not receive an update from the problematic slave or notice that the slave is not responding.
2.1 Leader marks all the tunneling connections of said slave as "un served" tunneling.
2.2 Leader reallocates the said clients among the other active slaves based on the current load.
3. The new selected servers send gratuitous ARP requests on each client IP address.
3.1 The router 170 will respond to the gratuitous ARP and will modify its ARP table.
4. Traffic from the Internet 180 to the client will go to the new slaves.
5. The slave will establish a new tunnel with the client.
6. On the other side of the server farm, the client may receive notification, after a "Time Out," that the server has crashed.
7. The client attempts to establish a new tunnel with the joint IP.
8. The leader will respond to the request and forward the response to the new slave.

Scenario 6:
If the leader fails, the present invention will perform the following process:
1. New requests for tunneling, TCP, or UDP will not be handled.
2. After 'SL' seconds, at step 350 in FIG. 3 the slaves begin a new selecting cycle. At the conclusion of the selecting cycle, one of the servers will become the new leader.
2.1 The new leader sends a gratuitous ARP request for the joint IP addresses.
2.2 The router 140 of subnet 145 will respond to the gratuitous ARP and will modify its ARP table.
3. The rest of the servers, as slaves, attempt to establish a TCP connection with the new leader via subnet 145. When a slave succeeds to establish the TCP connection with the new leader it sends a table with all of its clients.

Those skilled in the art will appreciate that the present invention can be in the form of additional software, which resides in each server or it can be in the form of an additional computer connected to both subnets 160 & 145 that perform the leader section.

Alternate embodiments will become apparent to those skilled in the art to which the present invention pertains without departing from its spirit and scope. Accordingly, the scope of the present invention is described by the appended claims and supported by the foregoing description.

What is claimed is:

1. A method for performing symmetrical load balancing in a packet-based network, said method comprising:
spoofing a router, said router being located between a group of two or more servers having at least one joint IP address and a network, such that a network side of the router is connected to the network and a server side of the router is connected to a first side of the group of two or more servers,
so that at least one remote client subnetwork, which is connected to a second side of the group of two or more servers in such a way that the router and the group of one or more servers is communicatively positioned between the remote client subnetwork and the network and the remote client subnetwork having remote clients of the group of one or more servers,
appears to be connected to the server side interface of the router to which said group of one or more servers is connected;
electing one server from the group of two or more servers as a leader of the group;
receiving a request for a new connection between the at least one remote client subnetwork and the network; and
the leader of the group selecting a server from the group of two or more servers for said request and forwarding said request to the selected server; and
wherein the operation of the group of two or more servers is transparent to a remote client of the at least one remote client subnetwork and to a node in the network and a connection between the remote client of the at least one remote client subnetwork and the node in the network is using the IP address of said remote client and the IP address of said node in the network; and
wherein the network is based on the Internet Protocol.

2. The method of claim 1, wherein said spoofing the router comprises configuring its subnets list with the remote client subnet, pretending that the remote clients are connecting to an interface of said router.

3. The method of claim 1, wherein said spoofing the router comprises configuring its IP mapping with one of the joint IP address as the next HOP to subnetwork, which do not comprises remote clients of said group of one or more servers.

4. The method of claim 1, wherein said electing one server as a leader of the group comprises entering a boot mode wherein each server executes a selection algorithm.

5. The method of claim 4, wherein executing a selection algorithm comprises broadcasting a first type message, the first type message indicating whether the server has the feature to be a leader and receiving one or more messages from other servers.

6. The method of claim 5, wherein if the one or more messages from other servers indicate they have the feature to be a leader, applying arbitration to select one leader.

7. The method of claim 6, wherein applying arbitration comprises receiving an Internet protocol address for each server indicating the feature to be a leader, and selecting a leader based on the value of the Internet protocol address.

8. The method of claim 7, further comprising maintaining the remaining servers capable of being a leader in a slave mode after a leader is selected.

9. The method of claim 7, wherein selecting a leader based on the value of the Internet protocol address comprises comparing the Internet protocol address from each server capable of being a leader, and making the server with the highest internet protocol address the leader.

10. The method of claim 1, further comprising the step of the elected leader of the group further comprises the server elected as a leader broadcasting a message indicating the server is an active leader.

11. The method of claim 1, wherein said receiving a request for a new connection between at least one of the subnetworks and the network is initiated from the networks with an IP address of a remote client comprises grabbing the request by the router, broadcasting an ARP request with the IP address of the remote client to said group one or more servers, responding of the leader to the ARP request and forwarding it to a selected server.

12. The method of claim 1, wherein the selected server establishing the connection with the appropriate remote customer and responding to future ARP requests, from the router, with the IP address of said remote customer with the physical address of the selected server itself.

13. The method of claim 1, wherein the network is the Intranet.

14. The method of claim 1, wherein the network is an Internet.

15. The method of claim 1, wherein the subnetworks are Internet.

16. A system for establishing symmetrical load balancing in a packet-based network of connection between one or more remote subnetworks and a network, the system comprising:
   a subnetwork comprising one or more remote clients;
   a group of two or more servers, which is an intermediate node between the remote subnetwork and the network, with one server selected as a leader and said leader is operative to forward any request for new connection between the one or more remote clients of said subnetwork and the network, to one of the servers of the group of two or more servers; and
   a router that is connected between said group of one or more servers and the network, the router being configured such that at least one remote client appears to be connected directly to the same interface of the router that the group of two or more servers is connected and wherein the one or more remote clients are clients of said group of two or more servers;
   wherein the operation of the group of two or more servers is transparent to a remote client of the at least one remote client and to a node in the network and wherein a connection between the remote client of the at least one remote client subnetwork and the node in the network is using the IP address of said remote client and the IP address of said node in the network; and
   wherein the network is based on the Internet Protocol.

17. The system of claim 16 wherein said group of one or more servers appears as a remote client.

18. The system of claim 16 wherein at least one of the subnetworks is capable for tunneling communication; wherein the tunneling is over IP.

19. The system of claim 16 wherein said group of servers has a joint IP addresses and each server has a private IP address.

20. The system of claim 19 wherein only the leader is responsible on the joint IP addresses.

21. The system of claim 19 wherein the selecting process is based on the private IP address of each server.

22. The system of claim 19 wherein each server is connecting to each subnetwork via a different interface.

23. The system of claim 19 further comprising a router that is connected between said one of the subnetworks and said group of one or more servers.

24. A method for performing symmetrical load balancing in a group of two or more servers having at least one joint IP address, wherein the group of two or more servers is located in an intermediate node between a packet-based network and at least one remote client subnetwork, wherein the intermediate node is associated with a router of which a first side of the router is connected to the packet-based network and a second side of the router is connected to a first side of the group of two or more servers, a second side of the group of two or more servers is connected to the at least one remote client subnetwork, said method comprising the steps of:
   spoofing the router so that the at least one remote client subnetwork, which is connected to the second side of the group of two or more servers, appears to be connected to the second side of the router as the group of two or more servers is connected;
   electing one server from the group of two or more servers as a leader of the group;
   receiving a request for a new connection between the at least one remote client subnetwork and the network; and
   selecting, by the leader of the group, a server from the group of two or more servers for handling said request and forwarding said request to the selected server,
   wherein the operation of the group of two or more servers is transparent to a remote client of the at least one remote client and to a node in the network and the request for a new connection between the remote client of the at least one remote client subnetwork and the node in the network is using the IP address of said remote client and the IP address of said node in the network; and
   wherein the network is based on the Internet Protocol.

* * * * *